Dec. 29, 1964 R. M. DRUMMOND ETAL 3,163,057
DRILLING MACHINE WITH A TEMPLATE CONTROLLED WORK
POSITIONING AND SPINDLE ACTUATING MEANS
Filed July 10, 1961 5 Sheets-Sheet 1
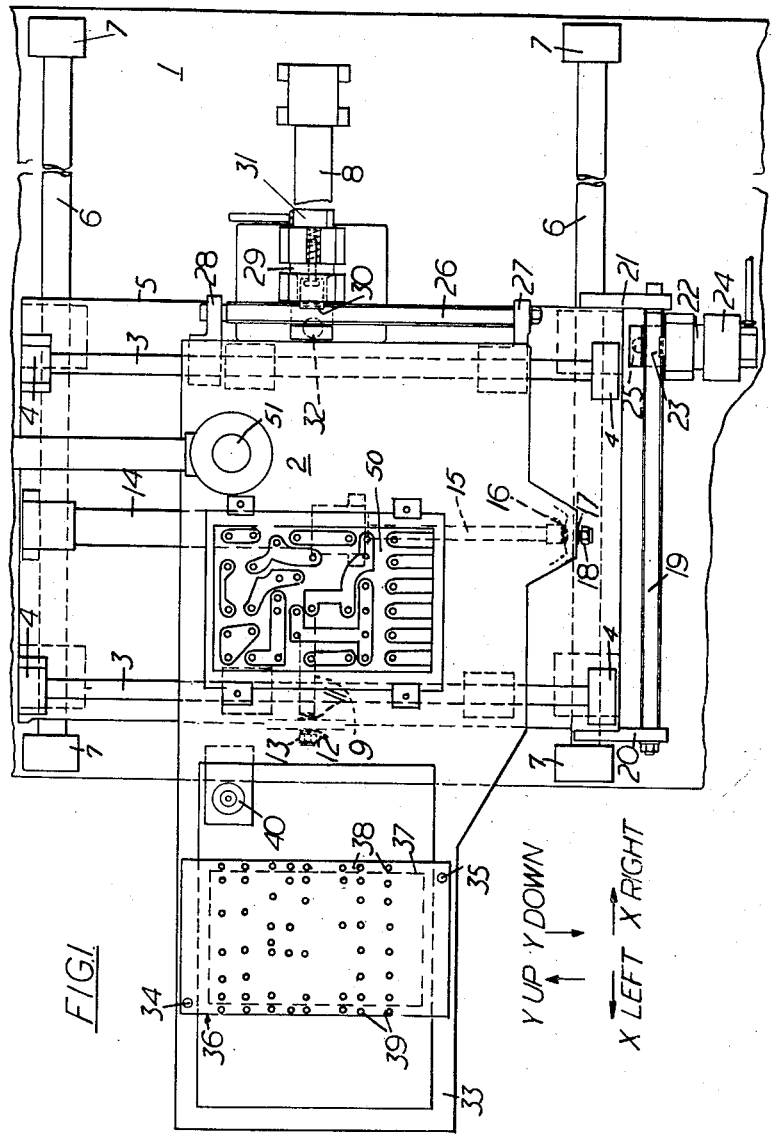
Inventors
ROBERT M. DRUMMOND
JOHN MANNERS-SMITH
By
Cameron, Kerkam & Sutton
Attorneys

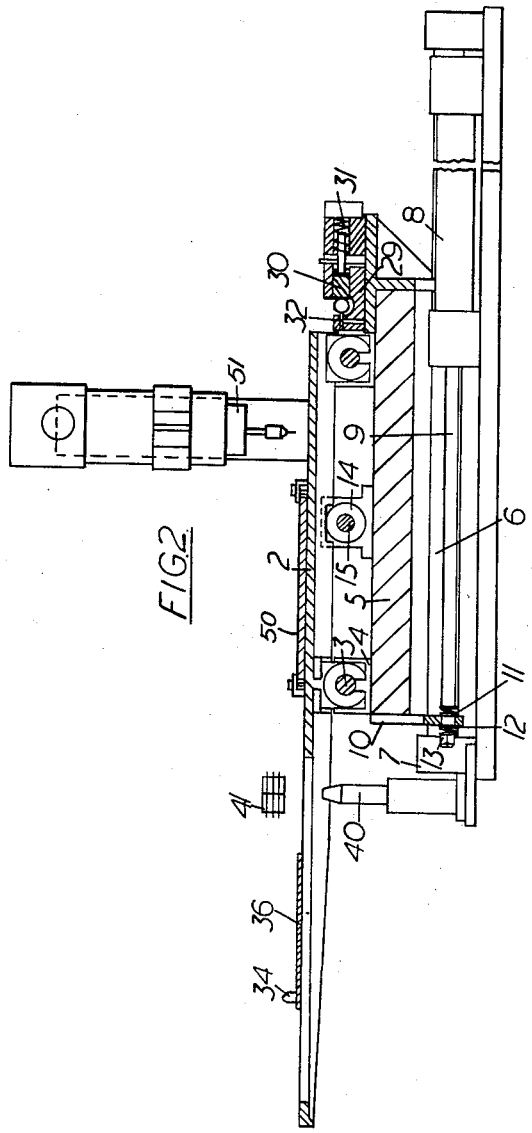

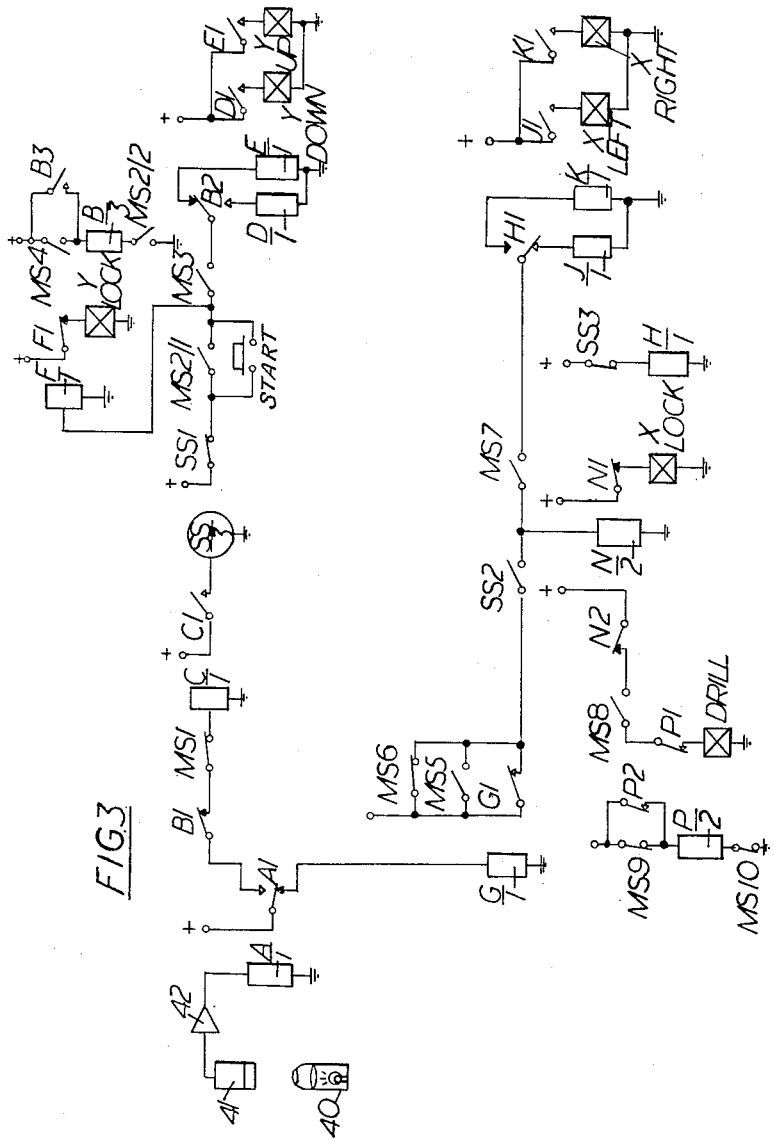

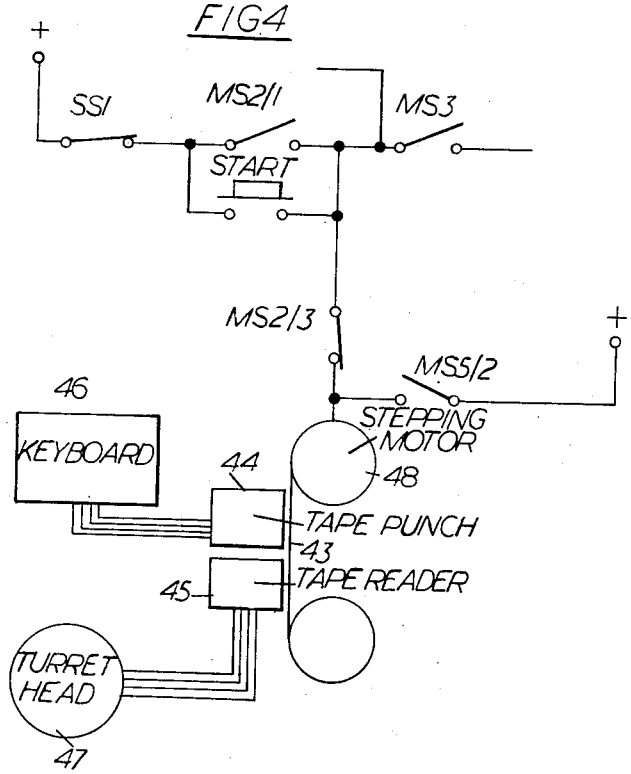

Dec. 29, 1964  R. M. DRUMMOND ETAL  3,163,057
DRILLING MACHINE WITH A TEMPLATE CONTROLLED WORK
POSITIONING AND SPINDLE ACTUATING MEANS
Filed July 10, 1961  5 Sheets-Sheet 5

INVENTORS
ROBERT M. DRUMMOND
JOHN MANNERS-SMITH
BY
Cameron, Kerkam & Sutton
ATTORNEYS

United States Patent Office 3,163,057
Patented Dec. 29, 1964

3,163,057
DRILLING MACHINE WITH A TEMPLATE CONTROLLED WORK POSITIONING AND SPINDLE ACTUATING MEANS
Robert Main Drummond, Cheadle, and John Manners-Smith, Manchester, England, assignors to Ferranti, Limited, Hollinwood, England, a company of Great Britain and Northern Ireland
Filed July 10, 1961, Ser. No. 122,729
Claims priority, application Great Britain, July 15, 1960, 24,668/60
10 Claims. (Cl. 77—32.2)

This invention relates to systems for automatically and sequentially locating a member in a predetermined series of positions with respect to an operational head.

When it is required to drill a large number of closely spaced holes in a plate, for example, it is not possible to use a multi-headed drill to drill all the holes simultaneously, and if it is required to drill the holes automatically the problem arises of controlling the location of the plate in which the holes are to be drilled relative to a single drill-head. This problem arises particularly when drilling holes in printed circuit boards for the insertion of components such as resistors and capacitors. Also, when it is required to insert components automatically in the holes previously drilled in the board there is a similar problem of locating the board relative to the component insertion head.

According to the present invention there is provided a system for automatically and sequentially locating a member in a predetermined series of positions with respect to an operational head, said positions being selected from a plurality of positions arranged in a matrix of rows and columns, in which relative movement is caused between a template containing a hole pattern corresponding to said predetermined positions and hole sensing means such that said matrix is scanned row by row, and in which relative movement is caused between said member and an operational head in synchronism with the movement between said template and said hole sensing means, control signals derived from said hole sensing means being used to stop said movements, actuate said operational head, and then re-start said movements.

Said operational head may be, for example, a drill head or a component insertion head.

In addition to said hole pattern said template may contain a control hole at each end of each row of said matrix in which one or more holes is located, control signals derived from said hole sensing means due to said control holes being used to control the relative movement between said template and said hole sensing means such that only the rows of said matrix containing one or more holes are scanned by said hole sensing means.

Also in accordance with the present invention there is provided a machine for automatically drilling in a plate a hole pattern comprising holes at selected points on a matrix of rows and columns, including a template carrier for carrying a template containing said hole pattern, hole sensing means, driving means for causing relative movement between said template carrier and said hole sensing means such that said hole sensing means scans said matrix row by row, a drilling machine having a co-ordinate table adapted to carry said plate, means for driving said table in the X and Y directions in synchronism with the movement between said template carrier and said hole sensing means, and means which, in response to an output from said hole sensing means, stops said driving means, causes a hole to be drilled in said plate, and re-starts said driving means.

Said template carrier and said table may be rigidly connected together.

Said hole sensing means may be a light source and a photoelectric cell.

Said table may be coupled to said driving means through a resilient coupling and said machine may further include means for accurately locking said table in position in response to an output from said hole sensing means, which means may include a threaded rod rigidly secured to said table and extending along the length thereof in the X direction, and a half-nut mounted with respect to the bed of the machine such that it is only movable in the Y direction, and means which, in response to an output from said hole sensing means urges said half-nut into engagement with said threaded rod. Similar means may also be provided for locking said table in the Y direction.

One embodiment of the present invention will now be described by way of example with reference to the accompanying drawings in which:

FIGURE 1 is a plan view of a drilling machine in accordance with the invention,

FIGURE 2 is a sectional elevation of the machine shown in FIGURE 1,

Figure 6:
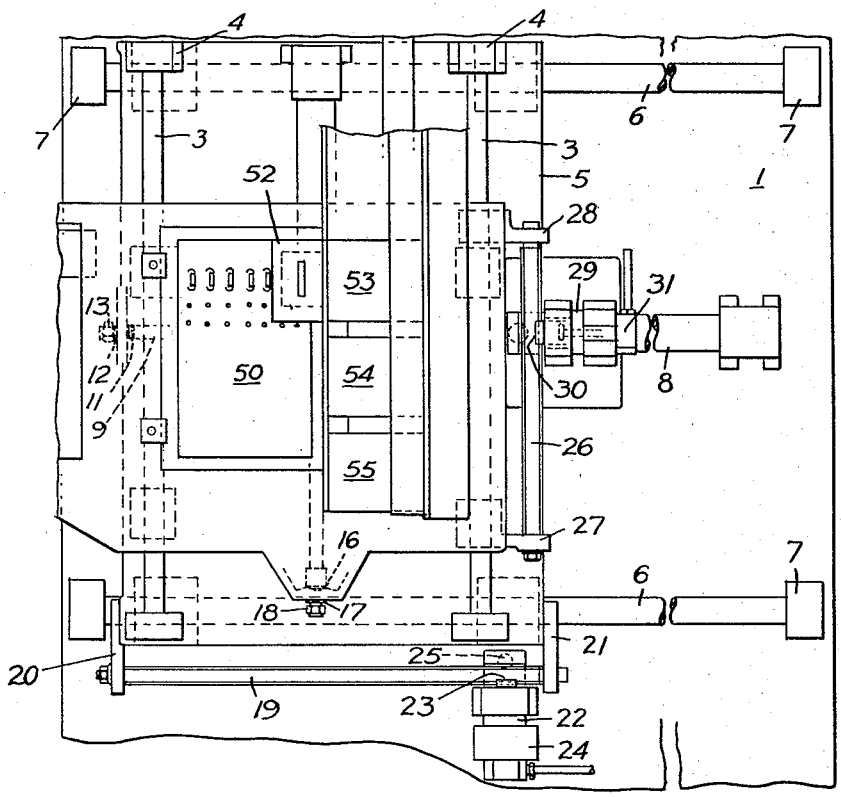
Figure 5:
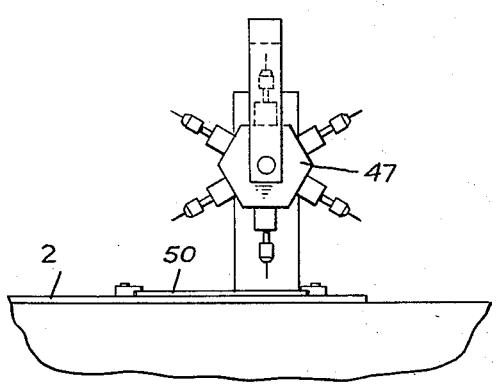

FIGURE 3 is a circuit diagram showing the electrical control circuit for the machine shown in FIGURE 1, FIGURE 4 is a circuit diagram of modifications to the circuit shown in FIGURE 3, FIGURE 5 is a fragmentary elevation view of a modified form of the drilling machine shown in FIGURE 1 embodying a turret-headed drill instead of a single headed drill, and showing the drill head in operative position, and FIGURE 6 is a fragmentary plan view of a drilling machine similar to that shown in FIGURE 1 modified by replacing the drill head with a component insertion head associated with a plurality of feed hoppers, and showing the insertion head in operative position.

Referring now to FIGURES 1 and 2 of the drawings the automatic drilling machine shown includes a fixed bed 1 and a co-ordinate table comprising a work-table 2 slidable on rails 3 secured by blocks 4 to a plate 5 which in turn is slidable on rails 6 secured by blocks 7 to the fixed bed 1 of the mchine. Hereinafter the direction parallel to the rails 6 will be referred to as the X direction and the direction parallel to the rails 3 will be referred to as the Y direction.

A hydraulic ram 8 mounted on the bed 1 is resiliently coupled to the plate 5 by means of a rod 9 having a reduced portion which passes through a lug 10 on the plate 5. Spring washers 11 and 12 bearing on the main portion of the rod 9 and a nut 13 threaded on the rod 9 respectively locate the lug 10 with respect to the rod 9. A similar hydraulic ram 14 mounted on the plate 5 is resiliently coupled to the work-table 2 by means of a rod 15 having a reduced portion passing freely through a lug (not visible) on the work-table 2. Spring washers 16 and 17 bearing on the main portion of the rod 15 and a nut 18 threaded on the rod 15 respectively locate the lug with respect to the rod 15. The work-table 2 may thus be moved in the X direction by means of the hydraulic ram 8 via the plate 5, and in the Y direction by means of the hydraulic ram 14 directly.

In order to lock the work-table 2 in any one of a series of positions in the X direction a threaded rod 19 is mounted on lugs 20 and 21 secured to the plate 5. A block 22 mounted on the bed 1 has a bore in which a half-nut 23 is slidable. The half-nut 23 is normally spring biased out of engagement with the rod 19 but may be urged into contact therewith by a hydraulic ram 24. To prevent distortion of the rod 19 when the half-nut 23 is urged into engagement with it a bearing 25 is mounted on the block 22 and bears on a groove in the rod 19. Thus, whilst the half-nut 23 is out of engagement with the rod 19 the plate 5, and therefore the work-table 2, may be moved in the X direction, but when the half-nut 23 is urged into engagement with the rod 19 the plate 5 is locked against movement in the X direction.

Similarly, to lock the work-table 2 in any one of a series of positions in the Y direction a threaded rod 26 is mounted on lugs 27 and 28 secured to the work-table 2. A block 29 mounted on the plate 5 has a bore in which a half-nut 30 is slidable. The half-nut 30 is normally spring biased out of engagement with the rod 26 but may be urged into engagement with it by a hydraulic ram 31. A bearing 32 mounted on the block 29 bears in a groove in the rod 26 to prevent distortion of the rod 26 when the half-nut 30 is urged into engagement with it. The work-table 2 is thus free to move in the Y direction when the half-nut 30 is out of engagement with the rod 26, but is locked against movement in the Y direction when the half-nut 30 is urged into engagement with the rod 26.

The work-table 2 has an extension in the form of a rectangular frame 33 which acts as a template carrier. The frame 33 has two pins 34, 35 on which a template 36 is located, the template 36 containing a hole pattern to be drilled, this being shown enclosed by the dotted line 37. In addition to the hole pattern the template 36 includes a control hole at each end of each row of holes, these control holes forming two additional columns 38 and 39. A light source 40 is mounted below the frame 33 and a photoelectric cell 41 is mounted above the frame 33 such that the template 36 may be moved between them.

In operation, electrical control means, to be described later, cause the machine to operate in the following manner. At the start position the work-table 2 is positioned such that the light source 40 and the photoelectric cell 41 are at the bottom right hand corner of the template 36 as shown in FIGURE 1 and in line with the column 38 of control holes, the half-nut 23, hereinafter referred to as the X lock, and the half-nut 30, hereinafter referred to as the Y lock, both being engaged with the respective rods 19 and 30. When the start button is pressed the Y lock is released and the actuator for the hydraulic ram 14 operated to move the work-table 2 and hence the template 36 in the Y direction until an output from the photoelectric cell 41 indicates that the first control hole in the column 38 has been reached. The operation of the ram 14 is then stopped and the Y lock actuator 31 operated to cause the Y lock to engage.

The holes of the hole pattern in the template 36 are arranged to lie on a matrix of rows and columns in which the spacing between the rows and columns is 0.050 inch and the thread on the rods 19 and 26 has a pitch of 0.050 inch. The accuracy of the control means operating the hydraulic ram 14 is such that the work-table 2 is stopped within .020 inch of the correct position when a hole in the template 36 is sensed. Therefore, when the work-table 2 is stopped the thread on the rod 26 may not be exactly aligned with the thread of the half-nut 30. Due to the inclusion of the spring washers 16 and 17 in the coupling between the hydraulic ram 14 and the work-table 2, the work-table 2 still has a slight amount of freedom in the Y direction despite the inoperation of the hydraulic ram 14. Therefore, when the half-nut 30, which has no freedom of movement in the Y direction, is urged into engagement with the rod 26 the faces of the mating threads slide on each other and move the work-table 2 against the resilience of one or other of the washers 16 and 17 until the threads are fully engaged. The work-table 2 is then accurately located and locked in position against any movement in the Y direction. Since the accuracy of the control means operating the hydraulic ram 14 is better than half the pitch of the thread on the rod 26 it is ensured that a crest of the thread on the rod 26 always lies between two crests of the thread on the half-nut 30 such that the work-table 2 is moved in the right direction for correct positioning. Since the thread on the rod 26 and the half-nut 30 may be cut very accurately, this is a very accurate method of positioning the work-table 2, an accuracy of 0.0001 inch being obtainable.

When the Y lock has been engaged the X lock is released and the actuator for the hydraulic ram 8 operated to move the work-table 2 in the X direction until an output from the photoelectric cell indicates the presence of the first hole to be drilled. The drive in the X direction is then stopped and the X lock engaged, this serving to accurately locate the work-table 2 against the resilience of one or other of the spring washers 11 or 12 in the X direction in the same way as that described above for the Y direction. A plate or workpiece 50 mounted on the work-table 2 is now accurately located with respect to a drill head 51 of a single headed drill. The drill is therefore operated and after the hole has been drilled in the plate the X lock is released, the drive in the X direction restarted and the operation repeated each time the photoelectric cell senses a hole.

After drilling the last hole in the first row the work-table 2 is again driven in the X direction until the control hole in the column 39 is sensed. The drive in the X direction is then stopped, the X lock engaged, the Y lock released and the drive in the Y direction started and continued until the next control hole in the column 39 is sensed. The drive in the Y direction is then stopped, the Y lock engaged, the X lock released and the drive in the X direction started to scan the next row of holes in the opposite direction from the previous row. This process is repeated over the complete pattern, the X drive being reversed at the end of each row such that the pattern is scanned row by row in a zig zag manner, only the rows of the matrix containing one or more holes to be drilled being scanned.

The control holes in the columns 38 and 39 are arranged such that after completing the drilling operation the work-table 2 is positioned with the photoelectric cell in register with the column 38, i.e. if the hole pattern contains an odd number of rows of holes an additional control hole is provided in each of the columns 38 and 39. After sensing the last hole in the column 38 the actuator controlling the hydraulic ram 14 is operated as before to drive the work-table 2 in the Y direction, the drive being continued until the work-table 2 reaches an end-stop. The drive in the Y direction is then reversed to return the work-table 2 to the start position, the outputs from the photoelectric cell 41 due to the control holes in the column 38 being made ineffective during the return travel.

The control circuit for effecting the above described operation of the machine is shown in FIGURE 3. The ouput from the photoelectric cell 41 is connected through an amplifier 42 to the control winding of a relay A, the amplifier 42 being such that an output from the photoelectric cell 41 causes the relay A to become energised. The relay A has one set of make and break contacts A1, of which the normally open contact (i.e. the contact which is open when the relay A is de-energised) is connected through a normally closed contact B1 of a relay B and a microswitch MS1 to the operating coil of a relay C. The relay C has one pair of normally open contacts C1 which control the supply of current to the operating coil of a stepping switch SS which has three pairs of contacts. The stepping switch contacts SS1 are connected in series with a normally open microswitch MS2/1, a normally open microswitch MS3 and the moving contact of a set of make and break contacts B2, of which the normally open contact is connected to the operating coil of a relay D, and the normally closed contact is connected to the operating coil of a relay E. The relay D has one pair of normally open contacts D1 which control the supply of operating current to an actuator, Y DOWN, which controls the operation of the hydraulic ram 14 (FIGURE 1) to move the work-table 2 in the Y DOWN direction as shown in FIGURE 1. The relay E has one pair of normally open contacts E1 which control the supply of operating current to an actuator, Y UP, which controls the operation of the hydraulic ram 14 to move the work-table 2 upwards as shown in FIGURE 1.

The operating coil of a relay F is connected between ground and a point between the microswitches MS2/1 and MS3, the single pair of normally closed contacts F1 being used to control the supply of operating current to an actuator, Y LOCK, which controls the operation of the hydraulic ram 31 for locking the work-table 2 against movement in the Y direction.

The supply of current to the operating coil of the relay B is controlled by two microswitches MS2/2 and MS4, the pair of contacts B3 acting as hold-on contacts across the microswitch MS4.

The normally closed contact of the set of contacts A1 controls the supply of current to the operating coil of a relay G. The relay G has one pair of normally open contacts connected in parallel with two microswitches MS5 and MS6, and in series with a pair of the stepping switch contacts SS2 and a microswitch MS7 to control the supply of current to the moving contact of a set of make and break contacts H1 of a relay H. The supply of direct current to the operating coil of the relay H is controlled by a pair of the stepping switch contacts SS3. The normally open contact of the set of contacts H1 controls the supply of current to a relay J which has a single pair of normally open contacts J1 used to control the supply of operating current to an actuator, X LEFT, which controls the operation of the hydraulic ram 8, FIGURE 1, to move the work-table 2 to the left, as shown in FIGURE 1. The normally closed contact of the set of contacts H1 controls the supply of current to a relay K which has a single pair of normally open contacts K1 used to control the supply of operating current to an actuator, X RIGHT, which controls the operation of the hydraulic ram 8 to move the work-table 2 to the right as shown in FIGURE 1.

The operating coil of a relay N is connected between ground and a point between the stepping switch contacts SS2 and the microswitch MS7. The relay N has two pairs of normally closed contacts of which the pair N1 control the supply of operating current to an actuator, X LOCK, which controls the operation of the hydraulic ram 24, FIGURE 1, for locking the work-table 2 against movement in the X direction. The pair of contacts N2 is connected in series with a microswitch MS8 and a pair of normally open contacts P1 of a relay P to control the supply of operating current to an actuator, DRILL, which controls the operation of the drill head 51 shown in FIGURES 1 and 2. The supply of current to the operating coil of the relay P is controlled by two microswitches MS9 and MS10, the pair of normally open contacts P2 acting as hold-on contacts across the microswitch MS9.

The locations of the microswitches MS1 . . . 10 on the machine are as follows. The microswitches MS1, MS6 and MS8 are adjustably located on the work-table 2 and arranged such that MS1 and MS6 contacts are open and MS8 contacts are closed only when the photoelectric cell 41 is located within the hole pattern area, i.e. within the dotted line 37 on the template 36, FIGURE 1.

The microswitch MS2, which has two pairs of contacts MS2/1 and MS2/2, is fixed to the bed of the machine such that the contacts open when the work-table 2 reaches the bottom limit of travel in the Y direction. The microswitch MS3 acts as a Y lock interlock such that when the half-nut 30 is engaged with the rod 26 the contacts are open. The microswitch MS4 is fixed to the bed of the machine such that the contacts open when the work-table 2 reaches the upper limit of its travel in the Y direction.

The microswitch MS5 is mounted on the drill head and is operated through a broken knee connection such that when the drill head is lowered the microswitch is not operated, but when the drill head is raised the microswitch contacts are closed for a short time which is determined by the operation of the circuit as hereafter described. The microswitch MS7 acts as an X lock interlock such that when the half-nut 23 is engaged with the rod 19 the contacts are open. The microswitches MS9 and MS10 are mounted on the drill head and act as upper and lower limit switches respectively, their contacts being open when the drill head is at the respective limit.

For the sake of clarity these microswitches have not been shown in FIGURES 1 and 2 since their positioning would offer no difficulty to one skilled in the art of machine tool control.

The operation of the circuit is as follows. When the work-table 2 is at the start position the following conditions prevail. The work-table 2 is at the bottom limit of its travel in the Y direction and the two pairs of microswitch contacts MS2/1 and MS2/2 are therefore open. Both the X lock and the Y lock are engaged and the microswitches MS7 and MS3 are therefore both open. The photocell is not energised and the relay A is therefore de-energised and the contacts A1 are therefore making with the normally closed contact. The photocell is also the hole pattern area and the microswitches MS1 and MS6 are closed and the microswitch MS8 is open. The stepping switch SS has four positions in which the contact conditions are as follows:

|  | SS1 | SS2 | SS3 |
| --- | --- | --- | --- |
| Position 1 | Closed | Open | Closed. |
| Position 2 | Open | Closed | Closed. |
| Position 3 | Closed | Open | Open. |
| Position 4 | Open | Closed | Open. |

At the start the stepping switch has its contacts positioned as for position 1 above.

The microswitches and relay controls are shown in the start condition in FIGURE 3.

When the start button, START, is pressed the relay F is energised opening the contacts F1 thus releasing the Y lock. As the Y lock releases the Y lock interlock microswitch MS3 closes and the relay E becomes energised. The contacts E1 therefore close and the actuator, Y UP, is operated to move the work-table 2 in the Y UP direction. As the work-table 2 moves from its lower limit in the Y direction both of the microswitches MS2/1 and MS2/2 close and the start button may then be released.

The photoelectric cell 41 now starts to scan the column 38 of control holes. When the first control hole is sensed the energisation of the photoelectric cell 41 causes energisation of the relay A so that the moving contact of the set of contacts A1 changes to the normally open contact. Relay C is thus energised and contacts C1 close causing the stepping switch SS to step one position. The contacts SS1 therefore open deenergising the relay F to close the contacts F1 and operate the actuator, Y LOCK, to cause the Y lock to engage. At the same time the switch contacts SS2 are closed and since the microswitch MS6 is closed the relay N becomes energised opening the contacts N1 thus releasing the X lock. As the X lock releases the X lock interlock microswitch MS7 closes thus energising the relay J through the contacts H1 closing the contacts J1 and thus operating the actuator, X LEFT. The work-table 2 now commences to move in the X LEFT direction. As the control hole in the column 38 moves away from the photoelectric cell 41 the relay A becomes de-energised causing the contacts A1 to change over. The relay G is therefore energised and the contacts G1 close so that as the photoelectric cell 41 enters the hole pattern area and the microswitch MS6 opens the travel of the work-table 2 in the X LEFT direction is not interrupted.

When the photoelectric cell 41 senses the first hole in the first row of the hole pattern the relay A becomes energised and the contacts A1 change over. This has no effect on the relay C since the microswitch MS1 is now open, and the stepping switch SS therefore does not change position. The change over of the contacts A1, however, de-energises the relay G, opening the contacts G1, and, since the microswitch MS6 is now open, this de-energises the relay N and cuts off the supply of direct current to the actuator, X LEFT. The contacts N1 therefore close and the actuator X LOCK, is operated causing the X lock to engage. The contacts N2 also close, and, since the microswitch MS3 is now closed, due to the photoelectric cell 41 being located within the hole pattern area and the relay P energised with the contacts P1 closed, the actuator, DRILL, is operated causing the drill head to lower and drill a hole in the plate.

When the drill head reaches its lower limit the microswitch MS10 is opened thus de-energising the relay P. The contacts P1 therefore open cutting off the supply of current to the actuator, DRILL, and the drill head starts to rise. As the drill head rises the microswitch MS5 is closed thus supplying current to energise the relay N thus releasing the X lock and operating the actuator, X LEFT, to re-start the movement of the work-table 2.

The provision of the microswitch MS5 on the drill head is necessary to start the movement of the work-table 2 since the photoelectric cell 41 is still aligned with a hole in the hole pattern. The microswitch MS5 must therefore be closed long enough to ensure that the table has moved far enough for the photoelectric cell 41 to become de-energised. The relay A then becomes de-energised causing the contacts A1 to change over and the relay G to become energised thus closing the contacts G1. Once the contacts G1 are closed the microswitch MS5 may open without interrupting the travel of the work-table 2 in the X LEFT direction.

This operation is repeated each time the photoelectric cell 41 senses a hole in the first row of holes in the hole pattern area.

After the last hole in the first row of holes within the hole pattern area has been sensed the actuator, X LEFT, is operated as before and the work-table 2 is again moved in the X LEFT direction and as the photoelectric cell leaves the hole pattern area the microswitches MS1 and MS6 close and the microswitch MS3 opens. The work-table 2 continues to move in the X LEFT direction until the first control hole in the column 39 is sensed. The relay A is then energised causing the contacts A1 to change over and, since the microswitch MS1 is now closed, the relay C is energised and the stepping switch SS steps to position 3. The contacts SS2 are thus opened and the relay N de-energised to stop the travel in the X LEFT direction and engage the X lock, the actuator, DRILL, however, not being operated since the microswitch MS3 is now open. The contacts SS3 are also opened and the relay H is de-energised causing the contacts H1 to change over.

At the same time the contacts SS1 are closed and, since the microswitch MS2/1 is now closed the relay F is de-energised, the Y lock released and the actuator, Y UP, operated to move the work-table 2 in the Y direction. As the control hole in the column 39 moves away from the photoelectric cell 41 the relay A becomes de-energised thus energising the relay G, but this has no effect since the switch contacts SS2 are open.

When the next control hole in the column 39 is sensed the relay A is energised causing the contacts A1 to change over and energise the relay C thus causing the stepping switch SS to step to position 4. Switch contacts SS1 therefore open and the relay F becomes de-energised and the travel in the Y UP direction is stopped, the Y lock becoming engaged. At the same time the switch contacts SS2 close and, since the microswitch MS6 is closed, the X lock is released. The switch contacts SS3 remain open and the relay H is therefore still de-energised so that the moving contact of the set of contacts H1 makes with the normally closed contact. The relay K is therefore energised and the contacts K1 close to operate the actuator, X RIGHT, and the work-table 2 is therefore moved in the X RIGHT direction. As the control hole moves away from the photoelectric cell 41 the relay A is de-energised, the contacts A1 change over thus energising the relay G and closing the contacts G1 so that when the photoelectric cell enters the hole pattern area and the microswitch MS6 opens, the travel in the X RIGHT direction is not interrupted. As the photoelectric cell 41 starts to scan the hole pattern area the microswitch MS1 opens and the microswitch MS3 closes and the drill head is therefore operated in the same way as described above each time a hole is sensed, the work-table 2 however, being moved in the X RIGHT direction.

When the next control hole in the column 38 is sensed the stepping switch SS is stepped to position 1 so that the work-table 2 is again moved in the Y UP direction and the switch contacts SS3 closed thus energising the relay H again. The contacts H1 therefore change over and when the next control hole in the column 38 is sensed the relay J is energised to close the contacts J1 and operate the actuator, X LEFT, whereby the work-table 2 is again moved in the X LEFT direction.

The photoelectric cell 41 is thus caused to scan successive rows of the hole pattern in a zigzag manner.

As previously stated, the hole pattern is arranged to have an even number of rows and therefore the last hole to be sensed by the photoelectric cell 41 is the last control hole in the column 38. The actuator, Y UP, is then operated in the same manner as described above and the work-table 2 is therefore moved in the Y UP direction until the Y upper limit is reached. The microswitch MS4 then closes and since the microswitch MS2/2 is closed the relay B is energised. The contacts B2 therefore change over causing the relay E to become de-energized and the relay D to become energised. The contacts E1 are thus opened and the contacts D1 are closed so that the actuator, Y DOWN, is operated. The work-table 2 is therefore moved in the Y DOWN direction, the contacts B3 acting as hold-on contacts when the microswitch MS4 opens as the work-table 2 leaves the upper limit. During the travel in the Y DOWN direction the contacts B1 are open and therefore the outputs caused by the photoelectric cell scanning the control holes in the column 38 have no effect on the position of the stepping switch SS. When the work-table 2 reaches the Y lower limit the microswitches MS2/1 and MS2/2 open and the relay B is de-energised. The contacts B1 therefore close, the contacts B2 change over and the contacts B3 open and the whole circuit is thus returned to the start condition.

The drilled plate 50 on the work-table 2 may then be changed for a blank plate and the whole operation started again by pressing the start button.

It will be seen that modifications to the hole pattern may readily be made since the holes in the template 36 may be filled in and fresh holes drilled in the desired locations.

If the machine is provided with manual means for starting and stopping the movement of the work-table 2 in the X and Y directions the machine may be used for drilling the hole pattern in the template 36 from an original drawing. To do this the photoelectric cell is replaced by a suitable stylus, the blank template is located on the work-table 2 and the drawing is mounted on the template carrier. The work-table 2 may then be positioned by placing the stylus over the hole locations marked on the drawing, the X and Y lock mechanisms ensuring that the work-table 2 is accurately located in the manner described above before a hole is drilled in the template.

The machine described above uses a single headed drill, as shown in FIGURES 1 and 2, and if it is required to drill more than one size of hole in a single plate it is necessary to prepare a separate template for each hole size, the machine being operated with each template mounted on the template carrier 33 in turn. If several hole sizes are required this repetitive operation is time consuming and FIGURES 4 and 5 show a modification to the machine described above by means of which more than one hole size may be drilled in a plate with the use of a single template.

Referring now to FIGURE 4, the machine is additionally provided with an information storage tape 43 and an associated tape punch 44 and tape reader 45. The tape punch is controlled by the output of a manually operated keyboard 46 and the output of the tape reader 45 is used to select a required size of drill mounted in the turret-head 47 of a turret-headed drill, such as that illustrated in FIGURE 5. The tape 43 is driven by a stepping motor 48 which is connected through a microswitch MS2/3 to one side of the start button and through a microswitch MS5/2 to a source of direct current. The microswitch MS2/3 is formed by a further set of contacts on the microswitch MS2 and is such that the contacts are closed when the work-table 2 is at the bottom limit of travel in the Y direction, i.e. in the start position. The microswitch MS5/2 is formed by a second set of contacts on the microswitch MS5 mounted on the drill head and the contacts of the microswitch MS5/2 close as the drill head rises after completing a drilling operation.

The remainder of the circuit is as shown in FIGURE 3.

In operation the information on the tape 43 may conveniently be punched when drilling the template. The template is drilled from an original drawing in the manner described above, but before drilling each hole in the template the operator actuates one of the keys on the keyboard 46 to indicate which size of drill is to be used at that particular position when drilling the plate. The keys on the keyboard 46 energise the punches in the tape punch 44 in well known manner to cause the appropriate information to be punched onto the tape 43. The hole is then drilled in the template and as the drill head rises the microswitch MS5/2 is closed operating the motor 48 to advance the tape 43 by one step in readiness for the information concerning the next hole. In this manner information concerning each hole in the hole pattern is punched onto the tape 43. At the end of the template drilling operation the tape 43 is re-wound to the start position. The preparation of the tape in this simple manner does not require the employment of skilled labour.

When drilling a plate the operation of the start button causes the motor 48 to step the tape 43 to the position containing information concerning the first hole to be drilled. The tape reader 45 senses this information and causes rotation of the turret-head 47 to select the required drill in readiness for drilling the first hole. As the work-table 2 moves away from the start position the microswitch MS2/3 opens as the microswitches MS2/1 and MS2/2 close.

The work-table 2 is moved in the Y UP direction to the first control hole and then in the X LEFT direction to the first hole to be drilled in the same manner as described above. The first hole is drilled and as the drill head rises the microswitch MS5/2 closes and the motor 48 steps the tape 43 to the next position. As the work-table moves to the next hole position, therefore, the turret-head is set in readiness for the next drilling operation. This is repeated each time a hole is drilled and in this manner the holes are drilled to any required siize.

If there is any possibility of the turret-head not having time to reach the desired setting whilst the table is moving between two adjacent positions the turret-head may be interlocked with the drill actuator such that whilst the turret-head is moving the drill head may not be operated.

The invention has been described above with reference to an automatic drilling machine but the invention may be applied to other machines where the problem arises of locating a member with respect to an operational head. For example, when it is required to insert components automatically in the holes previously drilled in a printed circuit board a machine similar to that described above may be used, the machine being modified as indicated in FIGURE 6 by replacing the drill head with a component insertion head 52 fed from a suitable hopper 53, the signals derived from the hole sensing means being used to actuate the component insertion head in the same manner as they were used to actuate the drill head. Furthermore, the component insertion head 52 may be associated with a plurality of feed hoppers 53, 54 and 55 containing different components, the signals derived from the tape 43 being used to select at each location the particular hopper to feed the insertion head. In this manner several different components may be inserted in one operation of the machine.

The machine described above may be modified in many ways. For example, the template carrier may be separate from the work-table and means provided for driving them both in synchronism. Alternatively the template carrier may remain stationary and the photoelectric cell and light source be moved to scan the hole pattern in the template as also the work-table may remain stationary and the drill head be moved in synchronism with the movement between the photoelectric cell and the template. Furthermore some hole sensing means other than the photoelectric cell and light source described could be used. For example, the sensing means might comprise a gas discharge nozzle located beneath the template, the pressure in the supply line to the nozzle being less when the nozzle is located beneath a hole than when it is not, the control signals being derived from pressure responsive means connected in the supply line. Also, circuits other than those shown in FIGURES 3 and 4 may be made to control the movements of the machine in the necessary manner.

What we claim is:

1. A system for automatically and sequentially locating a member in a pre-determined series of positions with respect to an operational head, said positions being selected from a plurality of positions arranged in a matrix of rows and columns, a template containing a pattern of holes arranged in a matrix of rows and columns corresponding to said pre-determined positions, hole sensing means, means for causing relative movement between said template and said hole sensing means such that said matrix is scanned row by row, said hole sensing means being operative to produce a control signal whenever a hole of said pattern is sensed, means for causing relative movement between said member and said operational head in synchronism with the movement between said template and said hole sensing means, first and second locating means for positively locating said member relative to said operational head in positions corresponding to said rows and columns, respectively, of said matrix, and means for utilizing the control signals derived from said hole sensing means to stop said movements, actuate said second locating means, actuate said operational head, release said second locating means and then re-start movements.

2. A system as claimed in claim 1 in which said template further contains a control hole at each end of each row of said matrix in which one or more holes is located, and means for utilizing the control signals derived from said hole sensing means due to said control holes to so control the relative movement between said template and said hole sensing means that only the rows of said matrix containing one or more holes are scanned by said hole sensing means.

3. A system as claimed in claim 1, a storage tape and an associated tape reader for producing information signals, means for automatically advancing said tape one step each time said operational head is actuated, and means for utilizing the signals derived from said tape to control the condition of said operational head.

4. A system as claimed in claim 3 in which said operational head is a turret-headed drill having a plurality of drills mounted thereon, said signals derived from said tape being utilized to select one of the drills mounted on said turret head.

5. A system as claimed in claim 3 in which said operational head is an automatic component insertion head associated with a plurality of feed hoppers containing components to be inserted by said insertion head in holes in a printed circuit board, said signals derived from said tape being utilized to select one of said hoppers to feed said insertion head.

6. A machine for automatically drilling in a plate a hole pattern comprising holes at selected points on a matrix of rows and columns, including a template containing said hole pattern, a template carrier for carrying said template hole sensing means, driving means for causing relative movement between said template carrier and said hole sensing means such that said hole sensing means scans said matrix row by row, said hole sensing means being operative to produce a control signal whenever a hole of said pattern is sensed, a drilling machine having a co-ordinate table adapted to carry said plate, means resiliently coupled to said table for driving said table in the X and Y directions in synchronism with the movement between said template carrier and said hole sensing means, first and second locating means for positively locating said table in each of the X and Y directions in positions corresponding to each of said rows and columns, respectively, of said matrix, and means responsive to the control signals derived from said hole sensing means for stopping said driving means, actuating said second locating means, causing a hole to be drilled in said plate, releasing said second locating means and re-starting said driving means.

7. A machine as claimed in claim 6 in which said template further contains a control hole at each end of each row of said matrix in which one or more holes is located, and means for utilizing the control signals derived from said hole sensing means due to said control holes to so control said driving means causing relative movement between said template carrier and said hole sensing means that only the rows of said matrix containing one or more holes are scanned by said hole sensing means.

8. A machine as claimed in claim 6 in which said template carrier and said table are rigidly connected together.

9. A machine as claimed in claim 6 in which each of said first and second locating means include a threaded rod rigidly secured to said table and extending along the length thereof, and a half-nut mounted with respect to the bed of the machine such that it is only movable in a direction perpendicular to said rod, and means responsive to a control signal from said hole sensing means for urging said half-nut into engagement with said threaded rod.

10. A machine as claimed in claim 6 in which said drilling machine includes a turret head having a plurality of drills mounted thereon, a tape containing information about each hole to be drilled, a tape reader for reading said tape, means for advancing said tape one step each time a hole is drilled, and means for utilizing signals derived by said tape reader from said tape to select one of the drills mounted on said turret head.

References Cited by the Examiner
UNITED STATES PATENTS

| | | | |
|---|---|---|---|
| 2,479,293 | 8/49 | Bayless | 77—5 |
| 2,947,203 | 8/60 | Ausenda et al. | 77—5 |
| 2,958,247 | 11/60 | Levine | 83—71 |
| 2,969,490 | 1/61 | Anderson et al. | 77—32.2 |
| 2,975,661 | 3/61 | Coleman | 77—32.2 |

WILLIAM W. DYER, Jr., *Primary Examiner.*

FRANK E. BAILEY, *Examiner.*